United States Patent Office 2,775,585
Patented Dec. 25, 1956

2,775,585

RIPENING CELLULOSE ESTERS IN SOLUTION

Harold Bates and James Wotherspoon Fisher, Spondon, near Derby, and John Richard Smith, London, England, assignors to British Celanese Limited, a corporation of Great Britain No Drawing. Application June 5, 1953,
Serial No. 359,972

Claims priority, application Great Britain June 9, 1952

17 Claims. (Cl. 260—230)

This invention relates to the production of organic acid esters of cellulose, especially cellulose acetate, having less than the theoretical maximum acyl content.

In the most used method of making cellulose acetate, cellulose is acetylated with acetic anhydride in the presence of a solvent for cellulose triacetate and of sulphuric acid as catalyst. The solvent is usually either acetic acid or methylene chloride, though other solvents, e. g. ethylene chloride, can be used. If acetic acid is employed, it is usually necessary to have present a fairly high proportion of sulphuric acid, e. g. 12–15% or more (based on the weight of the cellulose), since otherwise a clear solution of the cellulose triacetate is not obtained and the product is not homogeneous. Methylene chloride is however a more efficient solvent for this purpose, in the sense that, when it is used, a clear homogeneous solution can normally be obtained when the amount of sulphuric acid is as low as 1–2%. Methylene chloride is also more easily recovered than acetic acid.

When the acetylation is complete, and a clear solution has been formed, it is customary to subject the cellulose triacetate, while it is still in the acetylation solution, to a partial hydrolysis or "ripening," so as to reduce its acetyl content, for example to about 52–56% reckoned as acetic acid, and to render it soluble in acetone. When methylene chloride has been used as the solvent in the acetylation, ripening is effected by adding to the solution a further 6–8% (on the weight of the cellulose) of sulphuric acid, and also sufficient water to hydrolyse to acetic acid all the residual acetic anhydride in the solution and to provide about 40–70% (on the weight of the cellulose) for the ripening reaction, and then heating the solution to about 50°–60° C. with stirring until the desired degree of hydrolysis of the cellulose acetate has taken place.

United States Patent No. 2,470,191 describes a ripening process which has certain advantages over the conventional methods. In this process the sulphuric acid in a primary (i. e. unripened) acetylation solution is completely neutralised, about 100–400% of water (on the weight of the cellulose) over and above that required to hydrolyse residual acetic anhydride is added, and the solution is then heated to 125° C. or higher. This procedure not only enables the ripening to be performed much more rapidly than by the conventional methods, but also when applied to an acetylation solution containing methylene chloride as solvent it avoids the necessity for adding an extra 6–8% of sulphuric acid. On the other hand, even when acetic acid is used as solvent in the acetylation, the use of ripening temperatures above 125° C. makes it necessary to employ a pressure vessel for the ripening operation, while if methylene chloride is used the pressure developed may well be inconveniently high.

It is an object of the present invention to provide a method of ripening cellulose acetate which has been made in the presence of methylene or ethylene chloride as solvent and only a small amount of sulphuric acid as catalyst, which shall possess the advantages of the process described in United States Patent No. 2,470,191 but shall not require the use of very high pressures.

According to the invention a primary esterification solution, obtained by esterifying cellulose with an organic acid anhydride in the presence of more than 350% (on the weight of the cellulose) of methylene or ethylene chloride as solvent and sulphuric acid as catalyst, is ripened by adding water to the primary esterification solution in amount sufficient both to hydrolyse residual acid anhydride and to provide water for the ripening reaction and neutralising substantially all the sulphuric acid in the solution, removing from the solution by distillation a substantial proportion of its content of methylene or ethylene chloride without however reducing the methylene chloride content below 30% or the ethylene chloride content below 50% (on the weight of the cellulose), and then heating the solution to a temperature between 100° and 220° C. and maintaining it between these limits until the desired degree of ripening has taken place. Preferably the amount of solvent distilled off is such as to leave in the solution between 30 and 150% of methylene chloride or between 50 and 200% of ethylene chloride.

The invention is applicable to the ripening of organic acid esters of cellulose in general, especially esters of aliphatic acids containing 2–4 carbon atoms in the molecule such as cellulose acetate, cellulose propionate, cellulose butyrate, cellulose acetate propionate and cellulose acetate butyrate. It is particularly important in connection with the production of acetone-soluble cellulose acetate using methylene chloride as the acetylation solvent, and in describing the invention in more detail we shall refer particularly to this process. It will be understood that mutatis mutandis the information given applies also to the ripening of other cellulose esters, and that ethylene chloride may be used instead of the methylene chloride.

In the detailed description, amounts of reagents, solvent and catalyst used in the acetylation and ripening will be given as percentages of the weight of the cellulose starting material, unless otherwise stated, and the degree of acetylation (acetyl value) of the ripened cellulose acetate will be expressed as its acetyl content reckoned as acetic acid. The viscosity of the cellulose triacetate will be expressed as "units" representing the product of the time of fall in seconds through a BSS No. 3 Ostwald type viscometer of a solution of 6 gms. of the primary triacetate in 100 ml. of a mixture of 9 volumes of methylene chloride to 1 volume of ethyl alcohol at 25° C. and the constant of the viscometer.

The new process is particularly valuable in connection with the ripening of cellulose triesters of no more than moderate viscosity, and especially of cellulose triacetates of viscosity about 5 units or less. The viscosity of the triesters is a function mainly of their molecular weight (degree of polymerization), and this in turn depends largely on the molecular weight of the cellulose from which the ester has been made. Generally speaking, cellulose in the form of pulps (i. e. cellulose obtained from ligno-cellulosic materials such as wood, straw and grasses) has only a moderate viscosity, and when acetylated gives a cellulose triacetate of viscosity not more than 5 units. The cellulose of cotton linters may have a higher viscosity, though this depends on the amount of degradation which the cotton linters have undergone in the course of their purification. The viscosity of cellulose triesters made from a mixture of a pulp and cotton linters containing a substantial proportion, such as 35% or more, of the pulp is usually only moderate. A particularly valuable application of the invention is thus in the ripening of cellulose triacetate and other cellulose triesters made either from pulps or from mixtures of pulps and cotton linters in which the proportion of pulp is at least 35%.

When the cellulose triacetate or other cellulose triester is of no more than moderate viscosity in the sense described above, it is preferred to distil off so much of the solvent that the solution remaining has the form of a stiff plastic mass, and can be handled as a solid. It is of course surprising that a solution in this form can be satisfactorily ripened at all, but in fact it is found that the ripening proceeds very uniformly and at a satisfactory rate.

The primary acetylation solution may be made by known methods involving the use of methylene chloride as solvent, and preferably less than 5%, and especially about 0.8–2.5%, of sulphuric acid as catalyst. Such solutions contain, besides the cellulose triacetate and methylene chloride, residual acetic anhydride, a proportion of acetic acid (some generally remaining from an activating pretreatment and some formed as a by-product in the acetylation reaction) and sulphuric acid. Further acetic acid is of course formed by the hydrolysis of the residual acetic anhydride.

The amount of water added for the ripening, over and above that required to hydrolyse the residual acetic anhydride, is preferably more than 50%, and especially about 75–160%, of the weight of the cellulose. These figures allow for the loss of a small proportion, which distils off with the methylene chloride. When more water is added than is miscible with the solution to form a single phase, the solution may be well stirred so as to disperse the excess throughout the solution as a more or less fine emulsion. The water may be added in the form of dilute acetic acid.

The sulphuric acid may be neutralized by means of a carbonate, acetate, oxide or hydroxide of magnesium, an alkaline earth metal, zinc or aluminum, and of these compounds magnesium carbonate and acetate have proved to be particularly useful. The amount of the neutralising agent added may be equal to or somewhat in excess of the equivalent of the sulphuric acid employed as catalyst. The neutralising agent may be added for example as a solid, or (when sufficiently soluble) in solution in part or all of the added water (or dilute acetic acid) or in solution in glacial acetic acid, and is preferably well stirred in.

The solution is now heated to distil off part of the methylene chloride. To enable the full advantages of the invention to be realised, distillation should be continued until the amount of methylene chloride remaining in the solution is as low or nearly as low as is compatible with uniform ripening. This amount depends to some extent on the proportions of acetic acid and of water in the solution and on the viscosity of the cellulose triacetate, and is readily determined by simple test for acetylation solutions obtained under given conditions from a given cellulose starting material. In the usual method of acetylating cellulose using methylene chloride as the solvent, the primary solution, after residual anhydride has been hydrolysed, contains about 240–400% of acetic acid. If, as is preferred, about 75–160% of water has been added for the ripening, and if the viscosity of the triacetate (as determined on a sample) is not more than about 5 units, we prefer to distil off methylene chloride until the amount remaining is about 40–80% of the weight of the cellulose. If ethylene chloride was used as the solvent, the amount left in the solution is preferably about 70–120%.

To distil off the methylene chloride, the acetylation solution may be heated to about 70°–80° C. When nearly all the methylene chloride is to be distilled from the acetylation solution it may be necessary to conduct the final stages of the distillation under reduced pressure.

The solution from which methylene chloride has been removed is ripened by being heated in a pressure vessel to a temperature between about 100° and 220° C. and preferably between about 115° and 130° C. The use of of temperatures above 130° C., for instance up to 150° or 170° C., while it speeds up the ripening process, entails the development of higher pressures, and to this extent reduces the advantage of the new process. Especially when the solution is a stiff plastic mass, it will frequently be convenient to heat it to the ripening temperature and then allow it to stand at that temperature, and uniform ripening has been found to result under these conditions. On the other hand the solution may, if desired, be stirred during the ripening, the plastic mass preferably being broken up before being heated. As ripening proceeds the cellulose acetate becomes progressively more soluble in the acetic acid present, with the result that the viscosity of the solution falls; by the time ripening is complete, even solutions which are at first stiff plastic masses become clear mobile viscous liquids. The cellulose acetate can be precipitated from the ripened solution by known methods, e. g. by adding water or dilute acetic acid. If desired or necessary the ripened solution may be thinned, e. g. by means of acetic acid or acetone, before the cellulose acetate is precipitated.

The procedure described above may be modified in various ways. For example the methylene chloride which is distilled from the primary acetylation solution may be replaced by a smaller, an equal or even a greater volume of acetic acid, especially when the viscosity of the cellulose triacetate is above about 5 units. The additional acetic acid is preferably added before or during the removal of the methylene chloride.

In another modification, the process of the invention is applied to an acetylation solution in which a preliminary partial ripening has already taken place, especially a solution of a cellulose acetate which before such a preliminary ripening had a viscosity above about 5 units. In this method the preliminary partial ripening is carried out after the addition of water to the primary solution but in the presence of some unneutralised sulphuric acid and of all or the greater part of the methylene chloride used in the acetylation. Further sulphuric acid or another acid catalyst, e. g. hydrochloric acid or perchloric acid, may if desired be added to the primary solution; for instance the amount of sulphuric acid may be made up to about 5–8% of the weight of the cellulose. Thus for this stage of the ripening an acetylation solution containing a total of 5–8% of sulphuric acid and 30–100% of water may be heated to about 50–70° C. with stirring for about ½–2 hours. At the end of this stage the sulphuric acid and any other acid catalyst present is neutralised, further water is added if required, methylene chloride is distilled off, and ripening is completed at a temperature above 100° C., all as already described.

The invention is illustrated by the following examples. The parts given are by weight.

*Example 1*

A purified wood pulp (100 parts) was pretreated with 40 parts of glacial acetic acid for 4 hours, and then introduced into an acetylation mixture of 324 parts of acetic anhydride, 450 parts of methylene chloride and 1 part of sulphuric acid. When a clear solution had been formed, sufficient water was mixed in to hydrolyse all the residual acetic anhydride and provide in addition an amount of water equal to the weight of the cellulose starting material; this water contained in solution sufficient magnesium acetate to neutralise all the sulphuric acid used as catalyst.

The solution was now heated to 70°–80° C., at first under atmospheric pressure and later under reduced pressure, until 90% of the methylene chloride employed in the acetylation had distilled off, together with a small amount of acetic acid and about a quarter of the water in the solution. The solution now had the form of a stiff plastic mass of bubbly appearance. This was broken up and placed in an autoclave, in which it was heated to 120° C. for 4 hours, including 1 hour taken to reach this temperature. The autoclave was then cooled and opened. The solution, which was now a smooth liquid, was thinned somewhat with acetic acid and poured into water to precipitate the cellulose acetate. The precipitate was washed neutral and dried. The cellulose acetate so obtained had an acetyl value of 54.8%, and dissolved in 95% aqueous acetone to give a good solution. The pressure developed was 32 p. s. i. g.

In a parallel experiment in which none of the methylene chloride was removed, the pressure developed was 120 p. s. i. g., and after 4 hours ripening a product of acetyl value 56.4% was obtained, which when dissolved in 95% aqueous acetone gave only a fair solution. In another experiment in which 70% of the methylene chloride was removed, the product had an acetyl value of 55.8% (or 52.6% if the ripening was continued for a further 1½ hours). It dissolved in acetone, giving a good solution. The pressure developed was about 65 p. s. i. g.

Example II

The process of Example I was repeated, except that the amount of water added for the ripening was 140%, of which about 115% remained after removing 90% of the methylene chloride. A total of 4 hours in the autoclave (3 hours after reaching 120° C.) gave a product of acetyl value 53.0%, and a total of 7 hours (6 hours after reaching 120° C.) a product of acetyl value 48.4%; both dissolved in 95% acetone to give a good solution.

Example III 100 parts of cellulose was pretreated with 37 parts of glacial acetic acid and then introduced into an acetylation mixture of 324 parts of acetic anhydride, 428 parts of ethylene chloride and 2 parts of sulphuric acid. The temperature rose to 45° C., and after 2½ hours a clear solution was obtained. The sulphuric acid was then neutralised with magnesium acetate, and 100 parts of water added in addition to that required to destroy unreacted anhydride. 342 parts of ethylene chloride were then distilled off, leaving a stiff waxy mass. This was heated to 120° C. in an autoclave for 5 hours, after about an hour taken to reach this temperature. The pressure developed was 33 p. s. i. g. The resulting mobile solution was thinned somewhat with acetic acid and precipitated in the usual way. The precipitated cellulose acetate had an acetyl value of 53.1%, and dissolved in acetone to give a smooth solution. If no ethylene chloride was distilled off the pressure developed was 60 p. s. i. g. and the acetyl value of the cellulose acetate was 54.7%.

Having described our invention what we desire to secure by Letters Patent is:

1. A process for ripening cellulose esters of carboxylic acids containing 2 to 4 carbon atoms in the molecule made by esterifying cellulose with the anhydride of at least one such acid in the presence of more than 350% on the weight of the cellulose of a solvent selected from the group which consists of methylene chloride and ethylene chloride and of sulphuric acid as catalyst, which comprises adding water to the primary esterification solution in amount sufficient both to hydrolyse residual acid anhydride and to provide water for the ripening reaction, neutralising substantially all the sulphuric acid in the solution, removing from the solution by distillation a substantial proportion of its content of the solvent but retaining an amount of solvent which for methylene chloride is at least 30% and for ethylene chloride is at least 50% of the weight of the cellulose and then heating the solution to a temperature between 100° and 220° C. until the desired degree of ripening has taken place.

2. Process according to claim 1, wherein the amount of solvent retained in the solution is 30 to 150% in the case of methylene chloride and 50 to 200% in the case of ethylene chloride.

3. Process according to claim 1, wherein the cellulose starting material comprises at least 35% of a pulp, and the solvent is removed by distillation until the solution has assumed the form of a stiff plastic mass.

4. A process for ripening a cellulose triacetate, of viscosity at most 5 units (each unit being the product of the time of fall in seconds through a BSS No. 3 Ostwald type viscometer of a solution of 6 grams of the primary triacetate in 100 ml. of a mixture of 9 volumes of methylene chloride to 1 volume of ethyl alcohol at 25° C. and the constant of the viscometer), made by acetylating cellulose with acetic anhydride in the presence of more than 350% on the weight of the cellulose of a solvent selected from the group which consists of methylene chloride and ethylene chloride and of sulphuric acid as catalyst, which comprises adding water to the primary esterification solution in amount sufficient both to hydrolyse residual acetic anhydride and to provide water for the ripening operation, neutralising substantially all the sulphuric acid in the solution, removing solvent from the solution by distillation until the solution has assumed the form of a stiff plastic mass containing an amount of solvent which for methylene chloride is at least 30% and for ethylene chloride at least 50% of the weight of the cellulose, and then heating the solution to a temperature between 100° and 220° C. until the desired degree of ripening has taken place.

5. Process according to claim 4, wherein the amount of solvent contained in the said stiff plastic mass is 40 to 80% of the weight of the cellulose in the case of methylene chloride and 70 to 120% of the weight of the cellulose in the case of ethylene chloride.

6. Process according to claim 1, wherein the amount of water added over and above that required to hydrolyse residual acid anhydride is 75 to 160% of the weight of the cellulose.

7. Process according to claim 5, wherein the amount of water added over and above that required to hydrolyse residual acetic anhydride is 75 to 160% of the weight of the cellulose.

8. Process according to claim 1, wherein the solution is heated to a temperature between 115° and 130° C. until the desired degree of ripening has taken place.

9. Process according to claim 5, wherein the solution is heated to a temperature between 115° and 130° C. until the desired degree of ripening has taken place.

10. Process according to claim 1, wherein the cellulose has been esterified using 0.8 to 2.5% of its weight of sulphuric acid as catalyst.

11. Process according to claim 5, wherein the cellulose has been acetylated using 0.8 to 2.5% of its weight of sulphuric acid as catalyst.

12. Process according to claim 3, wherein before the end of the distillation of solvent from the solution a quantity of a carboxylic acid containing 2–4 carbon atoms in the molecule is added to the solution.

13. Process according to claim 5, wherein before the end of the distillation of solvent from the solution a quantity of acetic acid is added to the solution.

14. A process for ripening a cellulose triacetate made by acetylating cellulose with acetic anhydride in the presence of more than 350% on the weight of the cellulose of methylene chloride as solvent and 0.8 to 2.5% on the weight of the cellulose of sulphuric acid as catalyst, which comprises adding to the primary acetylation solution water in amount 75 to 160% of the weight of the cellulose in addition to sufficient water to hydrolyse residual acetic anhydride, neutralising substantially all the sulphuric acid in the solution, removing from the solution by distillation all but 40 to 80% of the methylene chloride calculated on the weight of the cellulose, adding acetic acid to the solution, and then heating the solution to a temperature between 115° and 130° C. until the desired degree of ripening has taken place.

15. A process for ripening a cellulose triacetate made by acetylating cellulose with acetic anhydride in the presence of more than 350% on the weight of the cellulose of ethylene chloride as solvent and 0.8 to 2.5% on the weight of the cellulose of sulphuric acid as catalyst, which comprises adding to the primary acetylation solution water in amount 75 to 160% of the weight of the cellulose in addition to sufficient water to hydrolyse residual acetic anhydride, neutralising substantially all the sulphuric acid in the solution, removing from the solution by distillation all but 70 to 120% of the ethylene chloride calculated on the weight of the cellulose, adding acetic acid to the solution, and then heating the solution to a temperature between 115° and 130° C. until the desired degree of ripening has taken place.

16. A process for ripening a cellulose triacetate of viscosity at most 5 units (each unit being the product of the time of fall in seconds through a BSS No. 3 Ostwald type viscometer of a solution of 6 grams of the primary triacetate in 100 ml. of a mixture of 9 volumes of methylene chloride to 1 volume of ethyl alcohol at 25° C. and the constant of the viscometer) made by acetylating cellulose with acetic anhydride in the presence of more than 350% on the weight of the cellulose of ethylene chloride as solvent and 0.8 to 2.5% on the weight of the cellulose of sulphuric acid as catalyst, which comprises adding to the primary acetylation solution water in amount 75 to 160% of the weight of the cellulose in addition to sufficient water to hydrolyse residual acetic anhydride, neutralising substantially all the sulphuric acid in the solution, removing from the solution by distillation all but 70 to 120% of the ethylene chloride calculated on the weight of the cellulose, and then heating the solution to a temperature between 115° and 130° C. until the desired degree of ripening has taken place.

17. A process for ripening a cellulose triacetate of viscosity at most 5 units (each unit being the product of the time of fall in seconds through a BSS No. 3 Ostwald type viscometer of a solution of 6 grams of the primary triacetate in 100 ml. of a mixture of 9 volumes of methylene chloride to 1 volume of ethyl alcohol at 25° C. and the constant of the viscometer) made by acetylating cellulose with acetic anhydride in the presence of more than 350% on the weight of the cellulose of methylene chloride as solvent and 0.8 to 2.5% on the weight of the cellulose of sulphuric acid as catalyst, which comprises adding to the primary acetylation solution water in amount 75 to 160% of the weight of the cellulose in addition to sufficient water to hydrolyse residual acetic anhydride, neutralising substantially all the sulphuric acid in the solution, removing from the solution by distillation all but 40 to 80% of the methylene chloride calculated on the weight of the cellulose, and then heating the solution to a temperature between 115° and 130° C. until the desired degree of ripening has taken place.

References Cited in the file of this patent

UNITED STATES PATENTS

| | | |
|---|---|---|
| 2,329,704 | Dreyfus et al. | Sept. 21, 1943 |
| 2,588,051 | Sharman et al. | Mar. 4, 1952 |

FOREIGN PATENTS

| | | |
|---|---|---|
| 362,489 | Great Britain | Dec. 1, 1931 |